July 18, 1961 D. V. MAGNUSON ET AL 2,992,979
ELECTROPHORESIS METHOD AND APPARATUS
Filed Oct. 3, 1957 3 Sheets-Sheet 1

Inventors.
Donald V. Magnuson
Hugh J. McDonald.
By Zabel, Baker, York, Jones & Dithmar
Attorneys

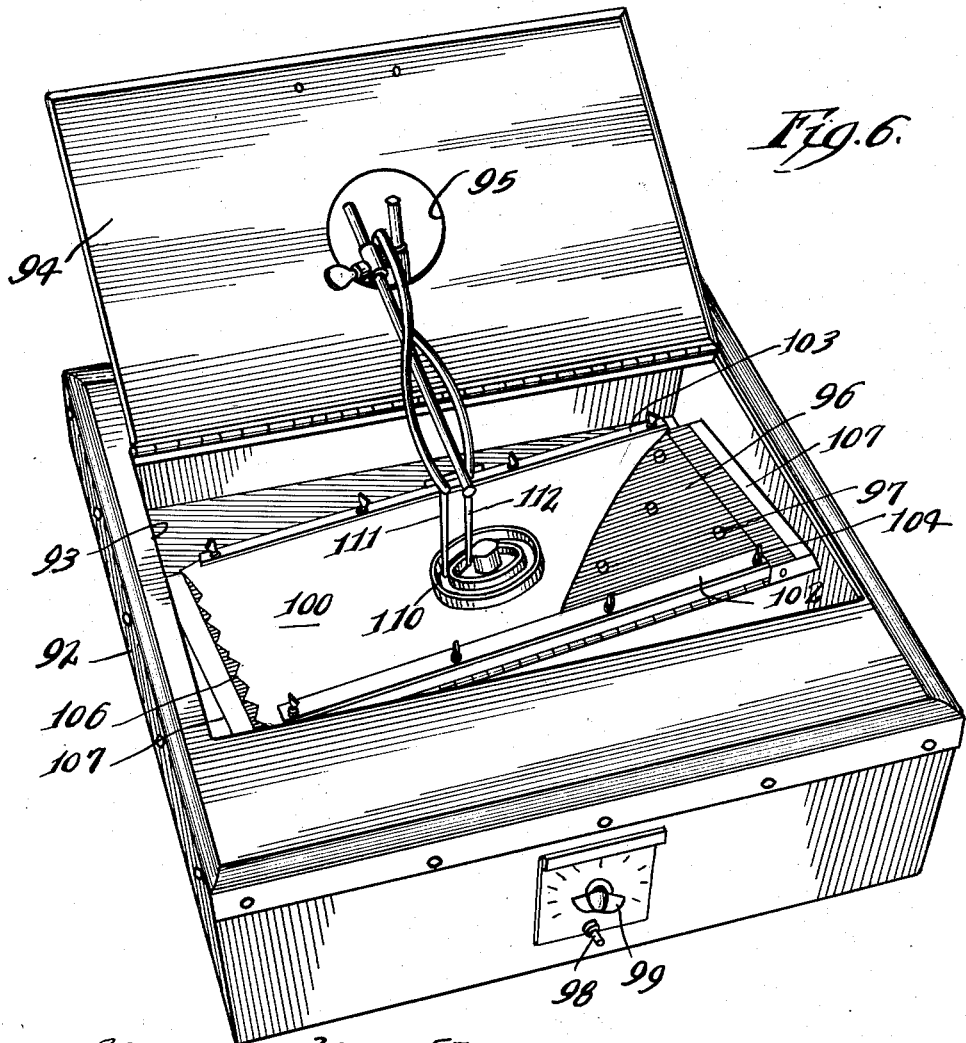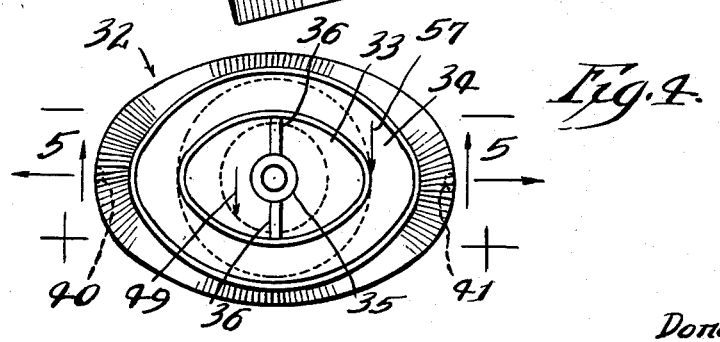

July 18, 1961 D. V. MAGNUSON ET AL 2,992,979
ELECTROPHORESIS METHOD AND APPARATUS
Filed Oct. 3, 1957 3 Sheets-Sheet 3
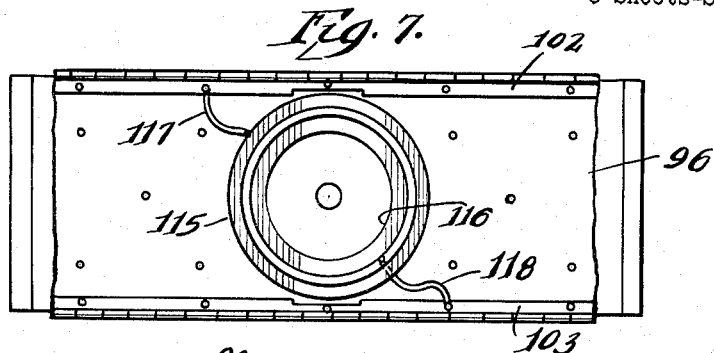
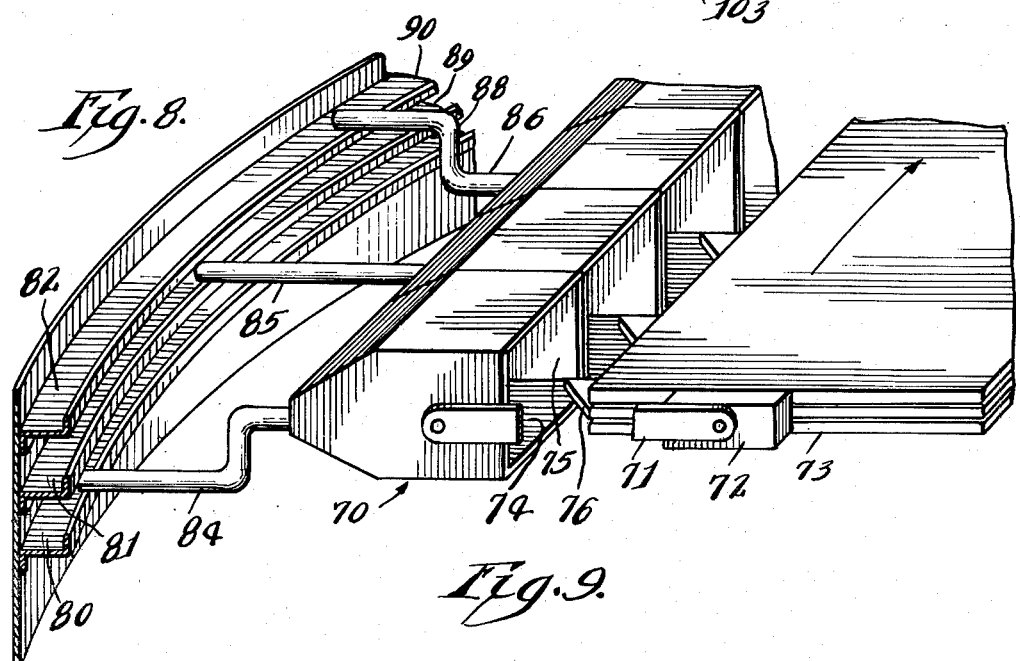
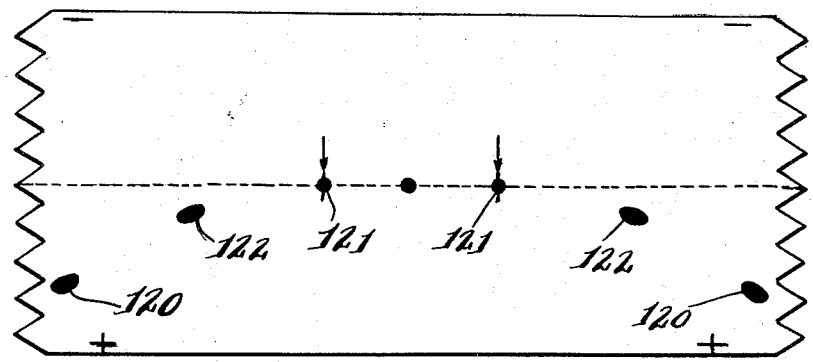
Inventors.
Donald V. Magnuson.
Hugh J. McDonald.
By Zabel, Baker, York, Jones & Dithmar
Attorneys.

United States Patent Office 2,992,979
Patented July 18, 1961

2,992,979
ELECTROPHORESIS METHOD AND APPARATUS
Donald V. Magnuson, and Hugh J. McDonald, Skokie, Ill., assignors to Labline, Inc., Chicago, Ill., a corporation of Illinois
Filed Oct. 3, 1957, Ser. No. 688,000
12 Claims. (Cl. 204—180)

This invention relates to electrophoresis (sometimes called ionophoresis) and more particularly to an improved method and apparatus for obtaining electrophoretic separations of migratory substances. In another aspect the invention relates to methods and apparatus for separating and collecting desired individual fractions of such substances.

Electrophoresis, briefly described, contemplates the division of a complex substance into its component fractions by means of a separation procedure based on migration of electrically charged fractions in a direct-current electric field. An electric field is developed between two spaced electrodes and the variously charged components of the substance migrate or drift toward the respective electrodes of opposite charge. The separation action takes place on a sheet of absorbent material such, for example, as filter paper which is wetted with a buffer solution. Each separable component of the substance travels along the sheet at a different characteristic rate and is subject, at the proper time, to qualitative and quantitative analysis.

The present invention, in brief, contemplates a separation procedure which involves the use of a centrifugal field in combination with an electric field, the two fields cooperating to provide the separation.

The method and apparatus of the invention are characterized by extreme flexibility in terms of substances which can be fractionated and in terms of speed with which separations may be made. Both the centrifugal field and the electric field are controllable over a wide range with the result that optimum fields may be used for any particular substance to achieve desired migratory paths.

One object of the invention is to provide an electrophoresis method and apparatus which involves use of a centrifugal field, as well as an electric field, and wherein the sheet of absorbent material is supported in such manner as to avoid objectional distortions in the separation pattern.

Another object of the invention is to provide an electrophoresis method and apparatus wherein the electrically charged fractions of the complex substance travel along separate paths, thereby avoiding the contamination which often results when two or more fractions have the same travel path.

Another object is to provide method and apparatus for fractionating a complex substance and separately collecting the individual desired fractions in a continuous manner. The capabilities of the method and apparatus are such that commercial volumes of the separation fractions can be obtained.

Another object is to provide an electrophoresis method and apparatus wherein any electrode products which may develop in the vicinity of the electrodes will be continually washed away. Thus, the separated fractions are not subject to contamination by such electrode products.

Another object is to provide an electrophoresis method and apparatus wherein the results obtained have greater accuracy and uniformity than heretofore. This, in part, is due to the elimination of decomposition or contamination resulting from extended time periods and adverse atmospheric conditions.

Another object is to provide an electrophoresis method and apparatus capable of handling migratory substances made up of molecules falling in a greatly extended range of sizes and weights.

Still another object of the invention is to provide an electrophoresis method and apparatus wherein the developing or buffer solvent is subject to extremely even distribution over the separation area of the absorbent material.

Still another object to provide method and apparatus of this character wherein minimum control of atmospheric conditions is required and wherein objectionable evaporation is minimized.

Briefly described, the present electrophoresis method involves subjecting a substance for fractionation to the joint effects of both centrifugal and electric fields. The electric field serves to separate the respective components of the substance depending on the characteristic electric charges of the components, while the centrifugal field serves to accelerate migration of the components in a direction generally normal to the direction of separation provided by the electric field.

Other aspects of the method invention contemplate the collection of desired fractions of the substance as they migrate out of the aforesaid centrifugal and electric fields, thus to provide a continuous process of fractionation.

Briefly described, the electrophoresis apparatus of the invention comprises a generally rectangular sheet of absorbent material, a head means mounted for rotation and carrying the sheet, motor means rotating the head means at controllable predetermined speeds, electrodes mounted on the head means and extending along the longer sides of the sheet, and means for energizing the electrodes to develop an electric field between them.

Other aspects of the apparatus invention relate to means for feeding the sheet of absorbent material with a substance for fractionation and with a buffer solution which carries the substance and its several fractions in migratory paths along the sheet.

Additional aspects of the apparatus invention deal with means for collecting the respective fractions as they are separated in the apparatus, one collector means comprising a series of collector cups and another collector means comprising stationary annular collectors which are fed continuously by the collector cups.

Other objects, advantages and details of the invention will be apparent as the description proceeds, reference being had to the accompanying drawings wherein one form of the invention is shown. It will be understood that the description and drawings are illustrative only and the scope of the invention is to be measured by the appended claims.

In the drawings:

FIG. 4 is an enlarged plan view of one form of feeder cup of the invention;

FIG. 5 is a sectional view on line 5—5 of FIG. 4;

FIG. 6 is a perspective view of a commercial form of apparatus embodying the invention;

FIG. 7 is a bottom view of the head element shown in FIG. 6;

FIG. 8 is an enlarged view of a fragmentary portion of the apparatus showing details of the collector cups and stationary annular collectors of the invention, and FIG. 9 is a plan view of a sheet of absorbent material illustrating the separated positions of fractions of a particular substance during the separation process.

Figure 1:
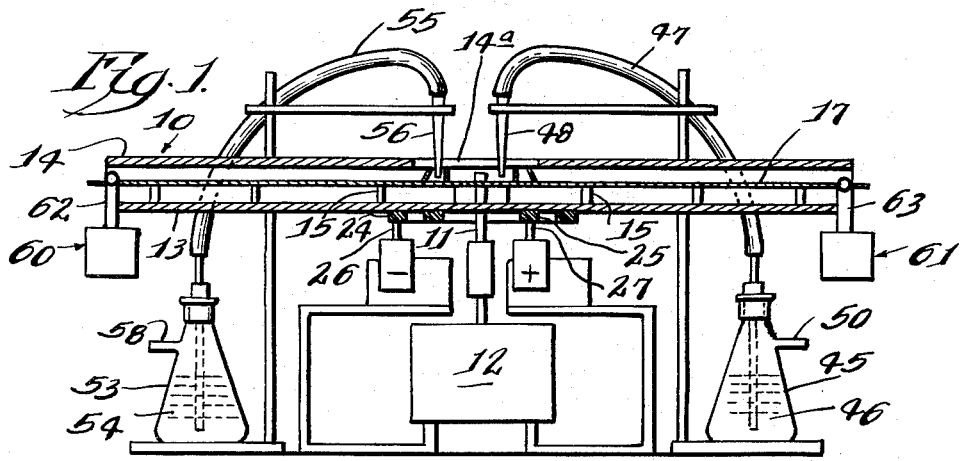
FIG. 1 is a diagrammatic elevational view, partly in section, of apparatus embodying the invention.
Figure 2:
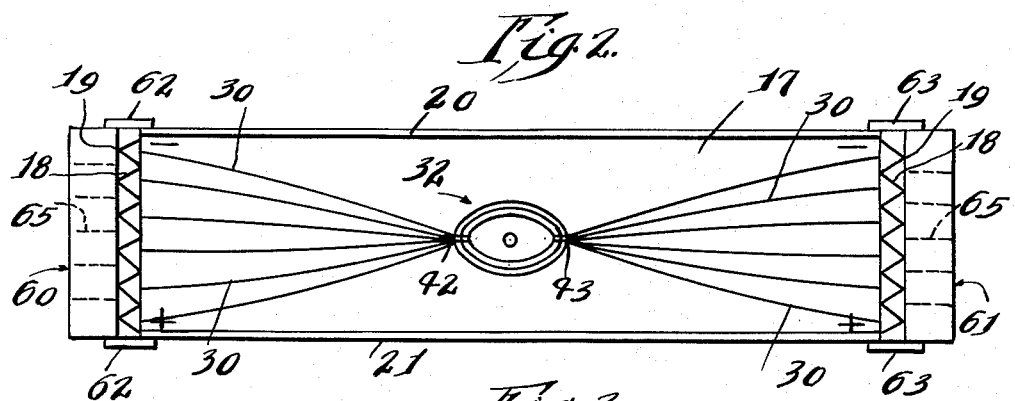
FIG. 2 is a plan view of a portion of the head element shown in FIG. 1, the view illustrating exemplary separation paths provided by the apparatus.
Figure 3:
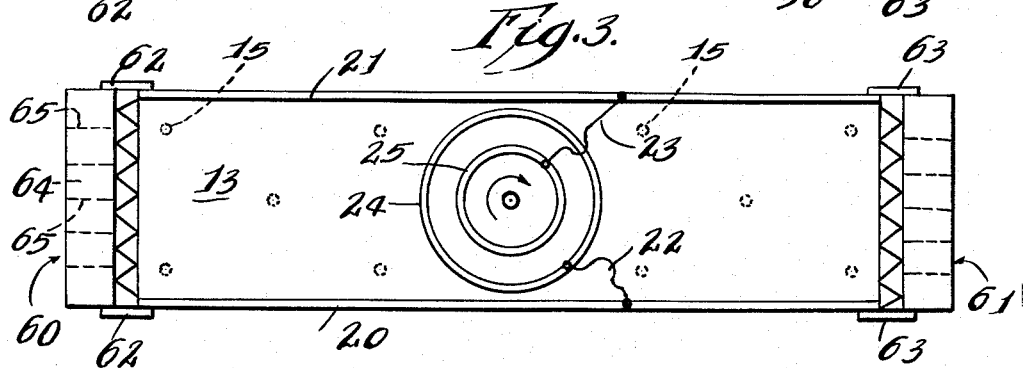
FIG. 3 is a bottom view of the head element shown in FIGS. 1 and 2.

Referring now to the drawings, FIGS. 1–3 diagrammatically illustrate electrophoresis apparatus embodying the invention.

The apparatus, as here illustrated, comprises a generally rectangular head 10 mounted for rotation at various predetermined speeds on shaft 11 of a motor 12. Head 10, of course, may be otherwise mounted for rotation and driven by motor 12 through a suitable transmission. Head 10 is shown disposed in a horizontal plane, but in some embodiments of the invention head 10 may occupy other planes inasmuch as the force of gravity is negligible compared with that of the centrifugal field.

As here shown, head 10 comprises a lower rectangular plate member 13 and an upper cover member 14, the two members being related, as by a hinge, so they may be disassociated, at least in part. When the two members are assembled as shown in FIG. 1, they are spaced from each other except possibly at the longer sides, as shown in FIG. 1. Cover member 14 has a generally central access opening 14a.

A plurality of spaced support elements 15 are mounted on plate 13. A suggested location for pin-type support elements is illustrated in FIG. 3.

A generally rectangular sheet 17 of absorbent material, such as filter paper or its equivalent, engages support elements 15. As shown in FIGS. 2 and 3, the ends of sheet 17 may have notches 18, the material between the notches 18 tapering to points 19. As will be understood, separation fractions will migrate from the sheet at the respect points 19.

A pair of electrodes 20 and 21 (FIGS. 2 and 3) extend along the longer sides of head 10 and sheet 17. In one form of the invention the longer edges of sheet 17 may be clamped physically to the respective electrodes 20 and 21, and such clamped relationship cooperates with support elements 15 to secure sheet 17 properly with respect to head 10. It is not necessary, however, that there be a direct connection between the electrodes and sheet 17, and in some instances it may be desirable to enclose the electrodes in some sort of a sheath to minimize or eliminate contamination from the electrodes which sometimes results from electrolysis effects.

Electrodes 20 and 21 are suitably energized as by connections 22 and 23 (FIG. 3) to electrically conductive means such as rings 24 and 25 mounted on the bottom of plate member 13. The latter usually is of insulating material but if not, rings 24 and 25 are suitably insulated therefrom.

Referring back to FIG. 1, rings 24 and 25 are energized by means such as brushes 26 and 27 connected to a source of direct-current potential, the polarity of the brushes being indicated by the associated plus and minus signs.

The apparatus so far described is sufficiently complete to perform electrophoretic separations such as is shown in FIG. 9. Sheet 17 initially is saturated with suitable buffer solution, and a substance for fractionation is applied as a drop to some portion of the sheet, said portion located a distance away from the precise center.

Head 10 is rotated at proper speed for the particular substance and the electrodes are energized with a suitable direct-current potential for the particular substance. It usually is necessary to add additional buffer solution more or less continuously during operation of the apparatus.

Fractional components of positive charge tend to migrate toward the negative electrode at a rate proportional to the magnitude of the charge and the intensity of the electric field, while fractional components of negative charge similarly migrate in the direction of the positive electrode. This migration, of course, results from forces directed transversely of the sheet 17.

The centrifugal force develops and accelerates migration longitudinally of the sheet with the result that the respective fractions migrate toward the end of the sheet in separate paths, as illustrated by the several paths 30 in FIG. 2.

Use of the apparatus as described above yields a qualitative and quantitative separation in an extremely short period of time. Because the time is short, no elaborate control of atmospheric and other conditions usually is necessary.

Apparatus of this general character is particularly useful for continuous type separations. In fact it may be employed for separations on a commercial scale.

For continuous type separations, a central feeder cup is provided. FIGS. 4 and 5 illustrate in large scale the feeder cup shown in FIGS. 1 and 2. Referring to FIGS. 4 and 5, feeder cup 32 is generally oval in shape. It comprises an inner cup 33 and an outer cup 34, the centers thereof being coaxial. A ring 35, connected to the walls of inner cup 33 by arms 36, serves to mount feeder cup 32 on the shaft of head 10, or motor shaft 11, as the case may be.

As shown in FIG. 2, cup 32 rests on top of sheet 17. Inner cup 33 is bottomless so that liquid directed into cup 33 flows more or less uniformly onto sheet 17.

Feeder cup 32 is oriented on sheet 17 with its major axis parallel to the longer sheet sides. Apertures 40 and 41 (FIGS. 4 and 5) are provided in bottom 42 of outer cup 34 at the ends of the major axis of the cup. Liquid fed into outer cup 34, namely the substance for fractionation, exits through apertures 40 and 41 and thus has point sources with respect to sheet 17, there being one point source on each side of the head axis. These point sources are designated 42 and 43 in FIG. 2.

Means are provided for continuously adding liquid in proper amount, to the inner and outer cups 33 and 34 of feeder cup 32. In the example shown in FIG. 1, a flask 45 containing buffer solution 46 is connected by conduit 47 to a nozzle 48 directed at the entrance opening of inner cup 33. Nozzle 48 is indicated diagrammatically by arrow 49 in FIG. 4, it being noted that care must be taken in locating nozzle 48 so that it is directed within the opening of inner cup 33 throughout cup rotation. Flask 45 has a connection 50 for a pressurized gas which develops predetermined flow of buffer solution from flask 45 to inner cup 33.

Similarly, a flask 53 containing substance 54 for fractionation is connected by a conduit 55 to a nozzle 56 directed to the entrance opening of outer cup 34. Here again, nozzle 56 must be positioned carefully, as indicated by arrow 57 in FIG. 4, so that substance 54 will be received in cup 33 throughout cup rotation. Flask 53 has a connection 58 for a pressurized gas to control the flow of substance from the flask to outer cup 34.

With the aforesaid feeder cup and suitable means for supplying buffer solution and substance for fractionation, it will be seen that the apparatus may be used for continuous separations. Means for continuously collecting the separation fractions now will be described.

Referring first to FIGS. 1–3, a series of collector cups is associated with each end of head 10. The cup series at the left end of the head in FIGS. 1–3 is designated 60 while the cup series at the right end of the head is designated 61. A cup series 60 or 61 has a hinged relationship with its associated head end. Referring to cup series 60, an arm 62 at each end of the cup series is hinged to head 10, the pin of the hinge preferably being mounted on plate 13. Similarly, cup series 61 has arms 63 pivoted to its associated head end.

Individual cups 64 of series 60 are defined in part by partitions 65.

FIG. 1 illustrates the head 10 and the two associated cup series 60 and 61 in an "at rest" position, that is, the cups hang downwardly from the head ends. In FIGS. 2 and 3 the head 10 and associated pair of cup series are illustrated in rotating condition, that is, the two cup series have been swung outwardly by centrifugal force into general parallelism with head 10. In this position the entrance openings of the individual cups 64 face the head ends and in particular face the respective points 19 of sheet 17. Thus, as separation fractions migrate from sheet 17 at points 19, centrifugal force directs the fractions into the aligned cup openings. When head 10 slows down at the conclusion of an instance of use and stops, the cup series drop down to the position shown in FIG. 1 and the separation fractions thereafter may be removed from the several cups.

Referring to FIG. 8, the fragmentary series of cups there shown is designated 70. The series is provided at each end with an arm 71 hinged or pivoted to a block 72 carried by head element 73. An individual cup 74 is formed in part by a partition 75. During rotation of the apparatus, the entrance opening of cup 74 is in alignment with tapered end portion 76 of the sheet of absorbent material carried by the head.

For continuous collection of separation fractions beyond the capacity of individual cups 74, a system of stationary collectors is provided. This system, also shown in FIG. 8, comprises annular collectors 80, 81 and 82, each collector having a continuous entrance opening. Conduits 84, 85 and 86 respectively lead from individual collector cups 74 and direct flow therefrom into the respective entrance openings of the collectors 81 and 82. The respective entrance openings of the collectors are designated 88, 89 and 90. A slight clearance exists between the ends of conduits 84, 85 and 86 and the innermost edges of the annular collectors so there is no interference with the pivoting action of cup series 70. Suitable drains (not shown) may lead from the respective collectors to storage containers.

Referring now to FIGS. 6 and 7 of the drawings, a more or less commercial embodiment of the apparatus invention is there shown. The illustrated apparatus includes a housing 92 having an access opening 93. An access closure 94 is provided for opening 93, the closure being hinged or otherwise detachably related with the housing. Closure 94 has a central opening 95 through which passes the means for adding both buffer solution and substance for fractionation to the apparatus.

A generally rectangular head 96 is mounted for rotation within housing 92, the head including suitable spaced support elements 97. Motor means (not shown) are provided for rotating said head at predetermined speeds. A motor switch actuator 98 and an actuator 99 for controlling the speed of the motor are shown mounted on the front wall of housing 92.

A sheet 100 of absorbent material, such as filter paper, rests on support elements 97, the longer sides of the sheet being clamped to head 96 by means of electrodes 102 and 103. As shown in FIGS. 6 and 7, electrodes 102 and 103 are hinged to the respective long sides of head 96 and thus can be swung open to release a sheet 100 and closed to clamp a sheet 100. Means such as wing screws 104 are provided to hold the electrodes in sheet-clamping position. The illustrated end of sheet 100 is notched and thus provided with discharge points 106. A series of collector cups 107 is provided at each end of head 96.

A feeder cup 110 of the type previously described is located on the axis of head 96, the cup resting on sheet 100. Nozzles 111 and 112 respectively direct a substance for fractionation and buffer solution to the outer and inner cups of feeder cup 110. When closure 94 is closed, nozzles 111 and 112, of course, extend through opening 95. Closure 94 performs generally the same function as the previously described cover member 14, and accordingly no separate cover member is necessary.

Referring to FIG. 7, electrodes 102 and 103 are shown mounted on the bottom of head 96. Electrically conductive means such as rings 115 and 116 are connected respectively to electrodes 102 and 103 by conductors 117 and 118.

FIG. 9 is a schematic representation of an electrochromatogram developed by apparatus embodying the invention. This electrochromatogram was obtained from two spot applications of a solution containing aniline red, bromphenol blue and methyl orange. Experimental conditions were veronal buffer, pH 8.0, ionic strength 0.01; potential gradient 35 volts per centimeter; rotor speed 250 revolutions per minute; temperature 25 degrees C.; paper Whatman No. 1, 56 centimeters by 22 centimeters; time of development 14 minutes. The fastest moving component 120 is bromphenol blue, the immobile component 121 is aniline red and the intermediate component 122 is methyl orange.

As will be understood, with this method and apparatus the centrifugal force tends to propel the solution in a thin straight line course out from the center, while the electric field, acting at right angles to the centrifugal field, tends to cause a drift of positively or negatively charged components to the electrode of opposite electrical sign. The result is that the components of the migrant solution assume distinct paths of migration which appear to be essentially linear in character as shown schematically by lines 30 in FIG. 2. The angle between the migration paths followed by charge particles and the long sides of the sheet is such that the tangent of the angle of deflection, at any given point along the course of the path, is given by the ratio of electromigration rate divided by the flow rate in the centrifugal field.

With this method and apparatus no appreciable problem is introduced by the fact that the electrodes run along the full length of each side of the sheet. As the buffer solution is introduced near the center of the sheet, it flows out at a uniform rate to form a circle of a steadily increasing diameter. As the front of this circle wave reaches the side of the sheet where the electrodes are attached, it divides evenly and flows along the electrodes to the four outside corner collection cups, impelled by centrifugal force. In this way, whatever electrode products may have collected along the edges of the sheet are continually washed away. By isolating the electrodes from actual contact with the sheet by means of suitable sheathing, such as cellophane, dialysis tubing, the interference of electrode products is reduced to a minimum.

From the above description it is thought that the construction and advantages of our invention will be readily apparent to those skilled in the art. Various changes in detail may be made without departing from the spirit or losing the advantages of the invention.

Having thus described our invention what we claim as new and desire to secure by Letters Patent is:

1. An electrophoresis method comprising the steps of applying a substance for fractionation to an off-the-axis-of-rotation portion of a rotatable flat sheet of absorbent material wetted with a buffer solution and position between and respectively spaced from a pair of spaced members which substantially enclose the sheet, generating a centrifugal force effective on said applied substance in a single general direction relative to the sheet by rapidly rotating the sheet on an axis perpendicular to the sheet, simultaneously applying a direct-current field between a pair of sheet margins parallel to and lying on opposite sides of the line between the axis of rotation and the sheet portion to which the substance is applied and collecting the fractions following separation.

2. The method of claim 1 wherein buffer solution is added to the sheet continuously during sheet rotation.

3. The method of claim 1 wherein additional buffer solution and additional substance for fractionation are added to the sheet continuously during sheet rotation.

4. Electrophoresis apparatus comprising a housing having an access closure, a motor within said housing, a generally rectangular plate member mounted for rotation within said housing on an axis perpendicular to the member and driven by said motor at predetermined speeds, a generally rectangular sheet of absorbent material in spaced parallel relation with said plate member, a cover member carried by said plate member in spaced relation with said sheet, said cover member having a central opening, means for feeding a substance for fractionation to an off-the-axis-of-rotation portion of said sheet, means for feeding a buffer solution to said sheet, electrodes extending along the longer sides of said sheet parallel to and lying on opposite sides of a line between the axis of rotation and said sheet portion, a pair of concentric rings of electrically conductive material carried by the plate member-cover member assembly and electrically connected respectively to said electrodes, means connecting a source of direct-current potential to said rings and means for collecting the fractions following separation.

5. The combination of claim 4 with the addition of a feeder cup disposed within the central opening of said cover plate and mounted to rotate with said plate member, said feeder cup having a bottom and side, said bottom having an elliptical periphery with its major axis parallel to said electrodes and having an exit opening at an end of the major axis to discharge to the sheet said substance for fractionation, said feeder cup also having a central opening in said bottom to pass said buffer solution to the sheet.

6. Electrophoresis apparatus comprising a generally rectangular sheet of absorbent material, head means mounted for rotation and carrying said sheet in a plane perpendicular to the axis of rotation, motor means rotating said head means at predetermined speeds, means for feeding a substance for fractionation to an off-the-axis-of-rotation portion of said sheet, electrodes mounted on said head means and extending along the longer sides of said sheet parallel to and lying on opposite sides of a line between the axis of rotation and said sheet portion, means electrically connecting a source of direct-current potential to said electrodes, means for collecting the fractions following separation and means supporting substantially all of said sheet in spaced relation with said head means.

7. The combination of claim 6 with the addition of a feeder cup positioned on the rotational axis of said sheet and rotatable with said sheet, said feeder cup having a bottom and sides, said bottom having an elliptical periphery with its major axis parallel to said electrodes and having exit openings at the ends of its major axis to discharge to the sheet a substance for fractionation, said feeder cup also having a central opening in said bottom to pass a buffer solution to the sheet.

8. The combination of claim 6 with the addition of a feeder cup positioned on the rotational axis of said sheet and rotatable with said sheet, said feeder cup having a bottom and sides, said bottom having an elliptical periphery with its major axis parallel to said electrodes and having exit openings at the ends of its major axis to discharge to the sheet a substance for fractionation.

9. The combination of claim 6 with the addition of a feeder cup positioned on said sheet and rotatable with said sheet, said feeder cup having an exit opening on the longitudinal center line and away from the rotatable axis of said sheet to discharge to the sheet a substance for fractionation.

10. The combination of claim 6 wherein said means for collecting comprises a series of collector cups hinged to said head means at each end of said sheet, said cups, during rotation of said head means, being aligned with the ends of said sheet to receive fractions which migrate from said sheet.

11. The combination of claim 10 with the addition of a stack of superposed annular collectors adjacent the circular path of said collector cups, each collector having a continuous opening in the side thereof facing said collector cup, and conduit means leading from said collector cups to the collector openings whereby liquids in the collector cups are communicated to the respective collectors.

12. The combination of claim 10 with the addition of annular collectors adjacent the circular path of said collector cups, each collector having a continuous entrance opening, and conduit means leading from said collector cups to the collector openings whereby liquids in the collector cups are communicated to the respective collectors.

References Cited in the file of this patent

UNITED STATES PATENTS 2,555,487  Haugaard et al. _____ June 5, 1951
2,768,948  McDonald _____ Oct. 30, 1956

FOREIGN PATENTS 149,966  Austria _____ June 25, 1937

OTHER REFERENCES

La Chimica e l'Industria, vol. XXXVII, No. 2, 1955, pp. 113–114, Art by G. Caronna.

Cromatographic Methods, vol. 2, No. 1, pub. by H. Reeve Angil & Co. Inc., 52 Duane St., New York 7, N.Y., March 1957, part by McDonald, Bermes, Jr., and Shepherd, Jr.

Proceedings of the Chemical Society, January 1957, London, pp. 23 and 24, article by McDonald, Bermes, and Shepherd.